Sept. 3, 1946.  E. P. SAUNDERS  2,406,906
ROTARY SINE INDEX PLATE
Filed April 23, 1945
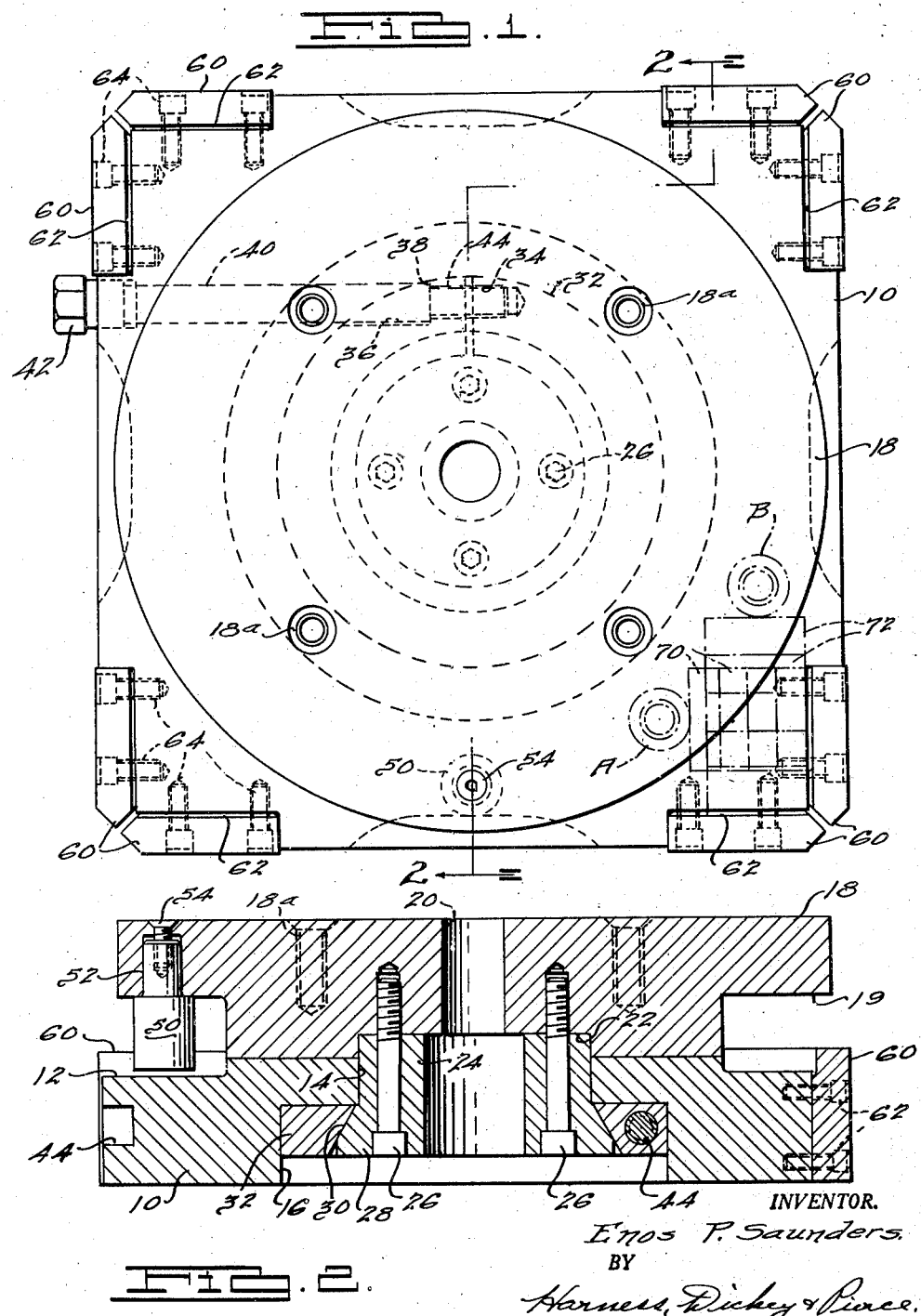
INVENTOR.
Enos P. Saunders.
BY
Harness, Dickey & Pierce.
ATTORNEYS.

Patented Sept. 3, 1946

2,406,906

UNITED STATES PATENT OFFICE 2,406,906

ROTARY SINE INDEX PLATE

Enos P. Saunders, Berkley, Mich., assignor to Triangle Engineering Company, Ferndale, Mich., a partnership composed of George L. Atherholt, Sr., Enos P. Saunders, and C. M. Smillie, Jr.

Application April 23, 1945, Serial No. 589,837

3 Claims. (Cl. 33—174)

This invention relates to rotary sine index plates and has for its principal object the provision that a rotary work supporting and locating device which may be angularly adjusted with extreme accuracy.

The present invention relates to that type of device commonly known as an index plate or rotary table. In the past these types of plates or tables have been produced either with circular scales, or relatively complicated indexing mechanisms, for enabling changes in angular relationship of the plate or table with respect to the base to be determined or established. I have found that the degree of accuracy provided by constructions as heretofore suggested is insufficient for the degree of accuracy required in many cases and in some cases involve such a complicated structure as to make the cost of the same so high as to be substantially unavailable to the bulk of the buying public.

The principal object of the present invention is to provide a device of the character described that is extremely simple in construction and therefore economical to manufacture and sell, and yet of a construction which is capable of being readily and quickly adjusted to any desired angle and with a consistent degree of precision not capable in similar structures heretofore proposed.

Those skilled in the art of tool making appreciate the fact that the method of determining the angularity of a conventional sine plate structure by the use of measuring instrumentalities of the type known to the trade as gage blocks produces an exact result. The present invention employs the same principle but as applied to a rotary index plate or table, and additionally provides a structure by means of which the angularity of the plate or table with respect to the base may be established or determined through 360° of rotation of one with respect to the other.

Referring now to the accompanying drawing which illustrates a simple embodiment of the present invention and in which like numerals refer to like parts in both of the views shown.

Fig. 1 is a plan view of my improved sine index plate; and,

Fig. 2 is a vertical sectional view taken on the line 2—2 of Fig. 1.

The base of the device comprises a generally rectangular and relatively thick plate 10 having a flat lower face and a flat upper face, the latter of which is vertically relieved radially outwardly of a circle concentric with the center of the base or plate 10 to provide a plane surface 12 arranged parallel to the upper and lower faces. The base or plate 10 is provided with a central bore 14 the lower end of which is counterbored as at 16 to provide an enlargement, the purpose of which will hereinafter be apparent.

Mounted in flat contacting relationship upon the upper face of the base 10 is a circular table or plate 18 having a flat upper face which may be suitably formed, as by means of tapped holes 18a or the like, for the securement of work thereto. The diameter of the plate 18 is preferably approximately equivalent to the dimensions of the sides of the base 10, shown slightly smaller by way of illustration. It is marginally vertically relieved as at 19 on its lower face on a diameter corresponding with the diameter of the relief 12 and in opposed relation to the latter. The plate or table 18 is provided with a central opening 20 therein, the lower end of which is counterbored as at 22 to a diameter equivalent to the diameter of bore 14 in the base 10. This counterbore 22 serves as a pilot for the upper end of the annular spindle 24 which is closely received therein and fixed thereto by means of a plurality of screws 26 projecting upwardly through the spindle 24 and threading into the plate or table 18 as shown. Within the counterbore portion 16 of the bore 14, the spindle 24 is provided with an enlarged head portion 28 provided on its periphery with an upwardly and inwardly tapered concentric frusto-conical face 30. Received within the counterbore 16 in surrounding relationship with respect to the head 28 is a split ring 32 provided with an inner face complementary to the frusto-conical surface 30 and received thereon.

The ring 32, as brought out in Figure 1, is provided with a bore 34 extending perpendicularly across the line of split thereof and such bore on one side of the line of split is threaded. The other end of the bore 34 is counterbored as at 36 to form a shoulder 38 therein. An elongated bolt 40 having a head 42 located on the outside of the base 10 rotatably projects through the base 10 and is provided with a reduced threaded end 42 forming a shoulder for co-operative engagement with the shoulder 38. The reduced threaded end 42 is rotatably received in the bore 42 on the side of the line of split corresponding with such shoulder and is threadably received in the bore 34 on the opposite side of the line of split. It will thus be understood that by tightening up the bolt 40, as applying a wrench or the like to the head 48 thereof, the line of split of the ring 32 is contracted and in contracting acts through the frusto-conical surface 30 of the spindle 24 and the axially inner face of the counterbore 16 to draw the contacting surfaces of the table 18 and base 10 into firm frictional engagement with respect to each other thereby to releasably lock the base 10 and table 18 together. Likewise by loosening up the bolt 40 the frictional engagement between the table or plate 18 of the base 10 is relieved and the plate or table 18 may be readily rotated on the base 10.

It will be understood that work may be suitably mounted on the plate or table 18 for the purpose of having a machining operation effected thereon, and that by rotating the plate or table 18 with the work thereon various machining operations may be effected on the work at predetermined angles with respect to each other about the axis of rotation of the plate or table 18.

The base 10 is provided with grooves 44 in its outer edges for reception of suitable or conventional clamping means (not shown) employed for clamping the base 10 to the table or the supporting surface of a machine tool or the like.

In order to permit measuring instrumentalities of the gage block type to be employed for accurately measuring the angle through which the table or plate 18 is shifted from one position to another about the axis of rotation thereof, or to permit a desired degree of angular shifting to be established with extreme accuracy, a cylindrical pin 50 is fixed to the lower relief face 19 of the plate or table 18 with its axis parallel to the axis of rotation of the plate or table 18 on the base 10. The pin 50 is located at an accurately predetermined distance from such axis of rotation of the table 18 on the base 10, such distance preferably being at a predetermined number of full measuring units from such axis, and not fractions of such units, so as to facilitate the calculation of the sine of the angle to be measured or established.

The pin 50 may be fixed with respect to the plate or table 18 in any suitable manner but in the particular case shown, it is provided with a shank 52 of reduced diameter fitting in a complementary sized hole in the lower face of the plate or table 18 and drawn firmly up into engagement with the relief face 19 by means of a screw 54 projecting down through the upper face of the plate or table 18 and threading into the shank 52. The diameter of the pin 50 may be a full-measuring unit, for instance an inch, or some major portion thereof such as one-half an inch, to further facilitate the determination of the sine of the angle to be established or determined as the case may be.

To provide a reference face for measuring the relative position of the pin 50 with respect to the sides of the base 10 or between two positions of adjustment thereof, anvil means are provided at all four sides of the base 10. While in the broader aspects of the invention such anvil means may run continuously around the base 10, or may constitute a separate anvil secured to each side edge of the base 10 over the full length thereof, it has been found sufficient if a relatively short anvil such as 60 is provided for each side edge of the base 10 adjacent each corner thereof and this is the construction shown by way of illustration. As shown, the various anvils 60 which comprise substantially flat blocks are each inset into a corresponding notch 62 provided in each side face of the base 10 at each corner thereof and each anvil 60 is secured therein to the base by means of screws 64. The inner faces of the two anvils 60, secured to each side edge of the base 10 are coplanar, parallel to the axis of the plate or table 18, and such plane is located at an accurately predetermined distance from the axis of rotation of the plate or table 18. It will be understood, of course, that this distance between the plane of the inner faces of the anvils 60 on each edge of the base 10 and such axis is constant for all of the anvils. The anvils 60 project upwardly above the plane of the relief 12 as brought out in Figure 2.

In mounting the device thus described upon the table or machine tool, care will usually be taken to arrange a side of the base 10 in absolute parallelism to the side of the table and the pin 50 may then if desired, although not necessarily, be located in the mid position either longitudinally of the table or transversely with respect thereto and the work mounted upon the upper face of the plate or table 18. Upon one operation having been performed upon the work and after which it is desired to rotate the work about the axis of the table through a predetermined angle, the table may be unlocked and rotated, and instrumentalities of the gage block type employed for accurately determining the sine of the angle through which adjustment is required, such measuring instrumentalities being employed between the pin 50 and a co-operating anvil 60.

As a matter of illustration, it may be assumed that in one position of operation the pin 50 is in the position indicated by the dotted line A in Figure 1. To determine the angle through which the table has been shifted in moving the pin 50 from the full line position shown to position A, gage blocks or the like may be arranged between the pin 50 in position A and the lower anvil 60 on the right hand side of the base 10 as viewed in Figure 1, as indicated at 70, and by calculations well understood by those skilled in the art, knowing the distance of the axis of the pin 50 to the axis of the rotation of the table 18 and the diameter of the pin 50, and the distance between the plane of the base of the co-operating anvil 60 and the center of the rotation of the plate or table 18 measured perpendicularly to such plane, the angle which the table 18 has been rotated through from the full line position to position A may be accurately determined.

Let it be assumed in such case that it is desired to rotate the table through a predetermined angle in a counterclockwise direction of rotation as viewed in Figure 1 to a position such as indicated at B. By the same type of calculations above referred to, it may be determined in such case that the axis of the pin 50 must be at a predetermined distance from the lower right hand anvil 60. Subtracting the radius of pin 50 a number of gage blocks such as 72, whose combined thickness equals such distance less such radius may then be stacked on one another and arranged against the lower right hand anvil 60 and projecting towards the desired position of the pin 50 at position B, and the table rotated in a counterclockwise direction to bring the pin 50 firmly into contact with the outermost "Jo block" 72, upon which the table may be locked against rotation with the assurance that it has been rotated exactly through the required angle of rotation.

Because of the arrangement of the anvils 60 completely around the base 10, it will be appreciated that the plate or table 18 may be rotated through 360° or any part thereof and its angularity determined in any position with extreme accuracy by the use of measuring instrumentalities of the character described. Those skilled in the art will appreciate the great accuracy with which such angularity may be determined in accordance with the device of the present invention and as compared to devices heretofore provided, and this in a device of extreme simplicity in construction.

What I claim is:

1. In a rotary sine index plate, in combination, a base having parallel sides and a flat upper face portion, a table rotatably mounted for rotation about a line midway between said sides and extending perpendicularly with respect to said face portion, a pin fixed to said table and arranged with its axis parallel to and spaced from the axis of rotation of said table and positioned in overlying relationship with respect to said face portion on said base, a plurality of anvils fixed with respect to said base in surrounding relationship with respect to said table, said anvils each having a locating face, the locating face of each of said anvils being arranged in a plane parallel to the axis of rotation of said table on said base and said planes of all of said anvils being arranged at an equal distance from the axis of rotation of said table, the planes of said locating faces of said anvils being arranged in a square whose center is coincident with said axis of rotation of said table, said anvils projecting upwardly above said face portion of said base and above the lower end of said pin, whereby measuring instrumentalities of the block type resting on said face portion may be interposed between said pins and an adjacent one of said anvils regardless of the rotatable position of said table on said base to determine the angular relationship of said table with respect to said base.

2. In a rotary sine index plate, in combination, a base having a plain upper marginal face, a table having a supporting face parallel thereto and rotatably mounted about an axis perpendicular thereto, a cylindrical pin fixed to said table with its axis in spaced and parallel relation with respect to said axis of rotation and in overlying relationship with respect to said face of said base, said base being square in plan view, an anvil fixed to each end of each side face of said base and projecting above the plane of said face thereof, the inner faces of each of such anvils being flat to provide a reference face, the reference faces of each of said anvils secured to each side face of said base being coplanar and the planes of the reference faces of the anvils on all sides of said base being identically the same distance, measured perpendicularly thereto, from the axis of rotation of said table on said base, whereby block type measuring instrumentalities may be supported on said face of said base in flat contacting relationship with respect thereto and with respect to the reference face of an adjacent anvil to measure the distance of said pin from said anvil, thereby to determine the angular position of said table with respect to said base over a total angularity of 360°.

3. In a rotary sine index plate, in combination, a base having a plain upper marginal face, a table having a supporting face parallel thereto and rotatably mounted about an axis perpendicular thereto, a cylindrical pin fixed to said table with its axis in spaced and parallel relation with respect to said axis of rotation and in overlying relationship with respect to said face of said base, said base being square in plan view, an anvil fixed to each end of each side face of said base and projecting above the plane of said face thereof, the inner faces of each of such anvils being flat to provide a reference face, the reference faces of each of said anvils secured to each side face of said base being coplanar and the planes of the reference faces of the anvils on all sides of said base being identically the same distance, measured perpendicularly thereto, from the axis of rotation of said table on said base, whereby block type measuring instrumentalities may be supported on said face of said base in flat contacting relationship with respect thereto and with respect to the reference face of an adjacent anvil to measure the distance of said pin from said anvil, thereby to determine the angular position of said table with respect to said base over a total angularity of 360°, and means for releasably locking said table in any position of rotatable adjustment on said base.

ENOS P. SAUNDERS.